(12) United States Patent
Kieffel et al.

(10) Patent No.: US 12,176,162 B2
(45) Date of Patent: Dec. 24, 2024

(54) GAS-INSULATED ELECTRICAL APPARATUS COMPRISING CARBON DIOXIDE, HEPTAFLUOROISOBUTYRONITRILE AND A HIGH CONTENT OF OXYGEN

(71) Applicant: General Electric Technology GmbH, Baden (CH)

(72) Inventors: Yannick Kieffel, Villeurbanne (FR); Diana Leguizamon Cabra, Villeurbanne (FR); Louis Maksoud, Villeurbanne (FR); Thomas Berteloot, Villeurbanne (FR)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 197 days.

(21) Appl. No.: 18/001,445

(22) PCT Filed: Jun. 10, 2021

(86) PCT No.: PCT/EP2021/065662
§ 371 (c)(1),
(2) Date: Dec. 9, 2022

(87) PCT Pub. No.: WO2021/250181
PCT Pub. Date: Dec. 16, 2021

(65) Prior Publication Data
US 2023/0223224 A1    Jul. 13, 2023

(30) Foreign Application Priority Data
Jun. 11, 2020   (EP) .................................... 20179558

(51) Int. Cl.
*H01H 33/22*    (2006.01)
*H01B 3/56*    (2006.01)
(Continued)

(52) U.S. Cl.
CPC ............... *H01H 33/22* (2013.01); *H01B 3/56* (2013.01); *H02B 13/055* (2013.01); *H01H 2033/566* (2013.01)

(58) Field of Classification Search
CPC ........ H01H 33/22; H01H 33/53; H01H 33/56; H01H 2033/566; H01B 3/56; H02B 13/055; H01F 38/20
(Continued)

(56) References Cited

U.S. PATENT DOCUMENTS 9,899,167 B2 *   2/2018  Florez ................ H01H 33/7015
10,236,146 B2 *  3/2019  Vigouroux ........... H01H 33/901
(Continued)

FOREIGN PATENT DOCUMENTS

CN    109830912 A     5/2019
WO    2014037566 A1   3/2014
(Continued)

OTHER PUBLICATIONS

Li et al.: Experimental study on the effect of O2 on the discharge decomposition products of C5-PFL/N2 mixtures. Journal of Materials Science: Materials in Electronics (2019) 30:19353-19361.
(Continued)

*Primary Examiner* — William A Bolton
(74) *Attorney, Agent, or Firm* — Eversheds-Sutherland (US) LLP

(57) ABSTRACT

The present application concerns a medium- or high-voltage equipment including a leaktight enclosure in which there are located electrical components and a gas mixture for providing electrical insulation and/or for extinguishing electric arcs that are likely to occur in the enclosure, the gas mixture including heptafluoroisobutyronitrile, carbon dioxide, and a high content of oxygen.

10 Claims, 2 Drawing Sheets

(51) Int. Cl.
*H01H 33/56* (2006.01)
*H02B 13/055* (2006.01)

(58) Field of Classification Search
USPC .......................................... 218/9, 13
See application file for complete search history.

(56) References Cited

U.S. PATENT DOCUMENTS

| | | | |
|---|---|---|---|
| 10,256,008 B2 * | 4/2019 | Johnson | H02B 13/055 |
| 10,566,159 B2 * | 2/2020 | Mantilla | B01J 23/38 |
| 10,573,426 B2 * | 2/2020 | Costello | H01B 3/56 |
| 2007/0221626 A1 | 9/2007 | Uchii | |
| 2016/0043533 A1 * | 2/2016 | Tehlar | H02B 13/035 73/19.01 |
| 2016/0241004 A1 | 8/2016 | Kieffel et al. | |
| 2019/0027268 A1 * | 1/2019 | Doiron | H01B 3/427 |
| 2019/0067918 A1 * | 2/2019 | Di-Gianni | H02B 13/045 |

FOREIGN PATENT DOCUMENTS

| | | |
|---|---|---|
| WO | 2015040069 A1 | 3/2015 |
| WO | 2015071303 A1 | 5/2015 |
| WO | 2017114862 A1 | 7/2017 |

OTHER PUBLICATIONS

International Search Report and Written Opinion for PCT/EP2021/065662, dated Sep. 14, 2021, 11 pages.

* cited by examiner

GAS-INSULATED ELECTRICAL APPARATUS COMPRISING CARBON DIOXIDE, HEPTAFLUOROISOBUTYRONITRILE AND A HIGH CONTENT OF OXYGEN

TECHNICAL FIELD

The invention relates to the field of electrical insulation and electric arc extinction in medium- or high-voltage equipment and, in particular, in highvoltage equipment.

The invention concerns a medium- or high-voltage equipment in which electrical insulation and/or electric arc extinction is performed by a gaseous medium comprising heptafluoroisobutyronitrile in a mixture with a dilution gas 10 comprising carbon dioxide and a high content of oxygen.

The invention also concerns the use of a gaseous medium comprising heptafluoroisobutyronitrile in a mixture with a dilution gas comprising carbon dioxide and a high content of oxygen as a gas for electrical insulation and/or for electric arc extinction in medium- or high-voltage equipment.

More particularly, the present invention relates to the use of insulation having a low environmental impact based on a gaseous medium comprising heptafluoroisobutyronitrile, carbon dioxide and a high content of oxygen as a gas for electrical insulation and/or for electric arc extinction in medium- or highvoltage equipment.

This insulation based on such a gaseous medium may optionally be combined with solid insulation of low dielectric permittivity.

Prior Art

In medium- or high-voltage substation equipment, electrical insulation and, if necessary, electric arc extinction are typically performed by a gas that is confined inside an enclosure in said equipment.

Above and below, the expression "medium voltage" is used in the conventionally accepted manner, i.e. the term "medium voltage" refers to a voltage that is greater than 1000 volts (V) for alternating current (AC) or greater than 1500 volts for direct current (DC), but that does not exceed 52,000 V for AC, or 75,000 V for DC.

In addition, the expression "high voltage" is used in the conventionally accepted manner, i.e. the expression "high voltage" refers to a voltage that is strictly greater than 52,000 V for AC and 75,000 V for DC.

Currently, the gas most often used in that type of equipment is sulfur hexafluoride ($SF_6$). That gas presents dielectric strength that is relatively high, good thermal conductivity and low dielectric losses. It is chemically inert, nontoxic for humans and animals and, after being dissociated by an electric arc, it recombines quickly and almost completely. In addition, it is non-flammable and its price is still moderate.

However, $SF_6$ has the main drawback of presenting a global warming potential (GWP) of 23,500 (relative to $CO_2$ over 100 years) and remains in the atmosphere for a time period of 3200 years, and this places it among gases having strong global warming power. $SF_6$ was therefore included in the Kyoto protocol (1997) in the list of gases for which emissions need to be limited.

The best way to limit $SF_6$ emissions consists in limiting the use of said gas, and this has led manufacturers to look for alternatives to $SF_6$.

To that end, a new gas presenting electrical insulation properties that are sufficient for an application in the field of high- or medium-voltage equipment has been developed. More precisely, that gas is a mixture of two molecules: one is present in a great majority and the second is heptafluoroisobutyronitrile of formula $(CF_3)_2CF\text{—}CN$ and of CAS number: 42532-60-5 and is present in a smaller amount. This gas mixture has the advantage of being based on an $SF_6$ substitute presenting a GWP that is less than that of $SF_6$ in solution in a host or dilution gas having a very low GWP, such as carbon dioxide ($CO_2$) having a GWP that is equal to 1, or of GWP that is zero, such as for nitrogen ($N_2$) or air. The heptafluoroisobutyronitrile gas implemented in these mixtures is sold by the 3M™ company under the commercial name 3M™ Novec™ 4710.

International application WO 2014/037566 describes the use of such mixtures as an insulation gas in high- or medium-voltage equipment, associated 10 with solid insulation [1].

A particular insulation gas, namely comprising heptafluoroisobutyronitrile, $CO_2$, and oxygen ($O_2$), oxygen being present in said gas medium in a molar percentage lying in the range 1% to 25%, is described in international application WO 2015/040069 [2]. Indeed, it has been identified that a few percent of oxygen added to the mixture comprising heptafluoroisobutyronitrile and $CO_2$ makes it possible to obtain synergy in the insulation properties of the gas mixture as a whole.

General Electric Company sells an electrical insulation gas mixture under the name $g^3$ (for "green gas for grid") which has 98% less impact of GWP than $SF_6$ 20 and which comprises and in particular consists of:

from 70 mole percent (mol %) to 97 mol % of $CO_2$,
from 3 mol % to 10 mol % of $(CF_3)_2CF\text{—}CN$, and—from 0 mol % to 20 mol % of $O_2$.

In the illustrative examples presented in international application WO 2015/040069 [2], the equipment is filled with mixtures comprising $CO_2$, $O_2$ and different molar percentages of $(CF_3)_2CF\text{—}CN$ at a pressure of 5 bars (i.e. 5000 hPa) absolute.

Nevertheless, for some applications such as circuit breakers, the electrical insulation mixture must be filled in the equipment with higher pressure such as, for example, a pressure above 7 bars (i.e. 7000 hPa) absolute. However, when the equipment is installed in a subzero temperature region, part of the high-pressure filled electrical insulation gas mixture can liquefy.

In particular, the inventors have noted that when a mixture comprising $CO_2$, 5 mol % of $O_2$ and 6 mol % of $(CF_3)_2CF\text{—}CN$ is implemented at a pressure of either 7.5 bars (i.e. 7500 hPa) absolute, or 8.5 bars (i.e. 8500 hPa) absolute, the liquefaction temperature of said mixture is −24.6° C. and −21.8° C. respectively. In addition, when the gas mixture comprises $CO_2$, 15 mol % of $O_2$ and 6 mol % of $(CF_3)_2CF\text{—}CN$, the liquefaction temperature of said mixture at a pressure of either 7.5 bars (i.e. 7500 hPa) absolute, or 8.5 bars (i.e. 8500 hPa) absolute is −24.8° C. and −22° C. respectively.

Such gas mixtures implemented in medium- or high-voltage substation equipment filled at a pressure equal to or higher than 7.5 bars (i.e. 7500 hPa) absolute do not comply with the International Electrotechnical Commission (IEC) standards that request −25° C. as minimum operating temperature without liquefaction.

In order to avoid the liquefaction phenomenon of electrical insulation gas or gas mixture when used in cold area, the auxiliary heating method is generally adopted to prevent the gas or gas mixture from reaching the liquefaction temperature, thereby ensuring the dielectric strength of the medium- or highvoltage equipment. Although the use of auxiliary heating can avoid liquefaction, this heating system complicates the design of the equipment, reduces its reliability in the event of its power supply being cut off, and gives rise to additional electricity consumption that may reach one hundred megawatt hours (MWh) over the lifetime of the equipment, which goes against the aim of reducing the environmental impact of the equipment and in particular, reducing carbon emissions.

In view of the above, the inventors have therefore generally sought to find an alternative to $g^3$ that has a reduced liquefaction temperature relative to $g^3$ at the same pressure, and to do so without external heater means added to the equipment.

Said alternative to $g^3$ needs to have low environmental impact comparable to the one of $g^3$ equipment, while maintaining the characteristics of the equipment, from the point of view of its insulating and extinguishing abilities, close to those of $g^3$ and close to those of $SF_6$, and without significantly increasing the size of the equipment.

More specifically, the inventors have sought to find an alternative to $g^3$, the liquefaction temperature of which is lower than $-25°$ C., in particular when 10 implemented in a medium or high-voltage high-pressure equipment.

DESCRIPTION OF THE INVENTION

These objects and others are achieved by the invention that proposes the use of a particular gas mixture, making it possible to obtain medium- or high-voltage equipment having low environmental impact and in which the liquefaction temperature is lower than the liquefaction temperature of $g^3$ at the same pressure.

More particularly, the insulation system implemented in the context of the present invention is based on a gas medium comprising $(CF_3)_2CF$—CN in a mixture with $CO_2$ and a high content of $O_2$ for use as a gas for electrical insulation and/or for electric arc extinction in medium- or high-voltage equipment.

Indeed, the inventors have surprisingly found that by using $O_2$ in an amount higher than disclosed in [2] and higher than implemented in $g^3$ makes it possible to reduce the liquefaction temperature of the gas mixture comprising $(CF_3)_2CF$—CN, $CO_2$ and $O_2$ when compared to the liquefaction temperature of the mixture comprising $(CF_3)_2CF$—CN, $CO_2$ and $O_2$ which is present in this mixture at a molar percentage lying in the range 0% to 25% and in particular in the range 1% to 20%.

In other words, the liquefaction temperature of the gas mixture comprising $(CF_3)_2CF$—CN, $CO_2$ and $O_2$ is highly influenced by the oxygen content when said content is equal to or higher than 26 mol % and in particular reaches a mole percentage equal to or higher than 30%.

The invention makes it possible to lower the liquefaction temperature of the gas mixture comprising $(CF_3)_2CF$—CN, $CO_2$ and $O_2$ even at low temperature and at high pressure, without implementing any heating device. This impact is quite significant as the liquefaction temperatures are reduced by more than 4 degrees when the oxygen ratio in the mixture reaches 50 mol %.

It should be noted that this effect is not linear with the oxygen concentration. Such a result was not expected since the liquefaction temperature of the mixture comprising $(CF_3)_2CF$—CN, $CO_2$ and $O_2$ is mostly driven by $(CF_3)_2CF$—CN in [2].

In addition, adding oxygen in the gas mixture $g^3$ does not affect the low environmental impact already obtained with the gas mixture $g^3$ since this increase consists in increasing the molar percentage of a gas with a GWP of 0 ($O_2$) and in reducing the molar percentage of a gas with a GWP of 1 ($CO_2$). Indeed, it is clear that preferably the increase in $O_2$ is not implemented at the expense of the $(CF_3)_2CF$—CN content since $(CF_3)_2CF$—CN is endowed with electrical insulation and electrical extinction properties suitable for enabling it to replace $SF_6$ in medium or high-voltage equipment.

In general, the present invention provides medium- or high-voltage equipment including a leaktight enclosure in which there are located electrical components and a gas mixture for providing electrical insulation and/or for extinguishing electric arcs that are likely to occur in said enclosure, the gas mixture comprising heptafluoroisobutyronitrile, carbon dioxide and a high content of oxygen.

In other words, in the equipment of the present invention, the gas insulation implements a gas mixture comprising $(CF_3)_2CF$—CN, $CO_2$ and a high content of $O_2$.

A medium- or high-voltage electrical equipment as implemented in the present invention mainly comprises a leaktight enclosure or casing advantageously of longitudinal shape, defining a hollow volume and electrical components that are arranged inside this enclosure or casing.

The inside volume of the enclosure is closed in a gastight manner and is filled with a gas for electrical insulation and for electric arc extinction, which gas 10 comprises a mixture including $(CF_3)_2CF$—CN, $CO_2$ and a high content of $O_2$.

In the context of the present invention, a high content of $O_2$ means that $O_2$ presents a molar percentage equal to or higher than 26%, in the gas mixture comprising $(CF_3)_2CF$—CN, $CO_2$ and $O_2$. More particularly, oxygen in this gas mixture presents a molar percentage lying in the range 28% to 50% and, more 15 particularly, in the range 30% to 50%.

Advantageously, the gas mixture implemented in the context of the present invention is a mixture, such as a ternary mixture, comprising or consisting of:
from 40 mol % to 72 mol % of carbon dioxide,
from 2 mol % to 10 mol % of heptafluoroisobutyronitrile,
and 20—at least 26 mol % of oxygen.

In a particular embodiment, the gas mixture implemented in the context of the present invention is a mixture, such as a ternary mixture, comprising or consisting of:
from 40 mol % to 70 mol % of carbon dioxide,
from 2 mol % to 10 mol % of heptafluoroisobutyronitrile,
and—from 28 mol % to 50 mol % of oxygen.

In a more particular embodiment, the gas mixture implemented in the context of the present invention is a mixture, such as a ternary mixture, comprising or consisting of:
from 40 mol % to 68 mol % of carbon dioxide,
from 2 mol % to 10 mol % of heptafluoroisobutyronitrile, and
from 30 mol % to 50 mol % of oxygen.

As already explained, in the present invention, the liquefaction temperature is influenced by the $O_2$ content. Based on the results they have obtained, the inventors propose the below Antoine Equation to calculate the content of each of $(CF_3)_2CF$—CN, $CO_2$ and $O_2$ in order to obtain a gas mixture exclusively or almost exclusively in the gaseous state under all temperature conditions for which this mixture is intended to be subjected to, once confined in equipment.

The temperature of liquefaction is the temperature when the pressure of the gas equals the vapor pressure curve. The vapor pressure curve is defined by the following Antoine Equation: $\log(/!"\#\#)$ $$= \frac{(A_0 + A_1 \cdot vfn)_3 \cdot vfo + B_4 \cdot vfo^2)_{20} - (1_\% + 1_\& \cdot vfn + B_2 \cdot (vfn \times 100)^2}{7 + 7} + 1$$

wherein

P/Torr is the pressure in Torr with P(in bar)=P(in Torr)/ 760 ! 1.01325, T/° C. is the temperature in Celsius degrees, vfn=volume fraction of $(CF_3)_2CF$—CN (mol %/100), vfo=volume fraction of oxygen (mol %/100),

A0=8.06963,

A1=6.60867,

B0=888.579,

B1=3352.37,

B2=−0.463139,

B3=−19.1895,

B4=−49.2516, and

C=247.971.

Advantageously, in the context of the present invention, the minimum utilization temperature Tmin is selected from 0° C., −5° C., −10° C., −15° C., −20° C., −25° C., −30° C., −35° C., −40° C., −45° C., and −50° C., and, in particular, selected from 0° C., −5° C., −10° C., −15° C., −20° C., −25° C., −30° C., −35° C., and −40° C.

In order to improve overall dielectric strength, in a hybrid insulation system, the gas mixture comprising $(CF_3)_2CF$—CN, $CO_2$ and a high content of $O_2$ may be used in combination with solid insulation, in particular of low dielectric permittivity, that is applied as solid insulating layers on those conductive parts that are subjected to a respective electric field that is greater than the breakdown field of the medium- or high-voltage equipment without the solid insulation. In other words, part of the electrical components arranged inside the enclosure of 20 the medium- or high-voltage equipment is covered by solid insulating layers.

These solid insulating layers can be of varying thicknesses such as the ones disclosed in international application WO 2014/037566 [1]. Alternatively, the insulating layers in a medium- or high-voltage equipment must be present a thickness of less than 1 mm such as the ones disclosed in international 25 application WO 2017/114862 [3].

In accordance with the invention, the equipment may be, firstly, a gas insulated electrical transformer, e.g. a power transformer or a measurement transformer.

It may also be an overhead or buried gas-insulated line, or a set of busbars for transporting or distributing electricity.

There may also be an element for connection to the other equipment in the network, e.g. overhead lines or partition bushings.

Finally, the equipment may also be a connector/disconnector (also called switchgear) such as, for example, a circuit breaker, such as a circuit breaker of the "dead tank" type, a "puffer" or "self blast"-type circuit breaker, a puffer-type circuit breaker having double motion arcing contacts, a thermal-effect puffer-type circuit breaker having single motion arcing contacts, a thermal-effect puffer-type circuit breaker having partial movement of the contact pin, a switch, a disconnector, such as air-insulated switchgear (AIS) or gas-insulated switchgear (GIS), a unit combining a switch with fuses, a grounding switch, or a contactor.

As already explained, the present invention can be applied to high-pressure medium- or high-voltage equipment.

Thus, in a particular embodiment of the invention, the equipment presents a minimum pressure of 7.5 bars (i.e. 7500 hPa) absolute and a nominal pressure of 8.5 bars (i.e. 8500 hPa) absolute. As a reminder, the dielectric characteristic of the equipment varies as a function of the pressure of the insulating gas between two extreme values, C1 corresponding to the critical pressure value (or minimum 20 pressure), and C2 corresponding to the nominal pressure value.

The present invention also provides the use of a gas mixture comprising $(CF_3)_2CF$—CN, $CO_2$ and a high content of $O_2$ as a gas for electrical insulation and/or for electric arc extinction in medium- or high-voltage equipment, in which part of the electrical components may further be covered with a solid insulating layer as 25 defined below.

Other characteristics and advantages of the invention can be seen more clearly from the additional description below, given by way of illustrative and non-limiting example.

DETAILED DESCRIPTION

In the following experiments, the leaktight enclosure of a high-voltage equipment was filled subsequently starting by $(CF_3)_2CF$—CN, and $CO_2$ and $O_2$ at the end.

Figure 1:
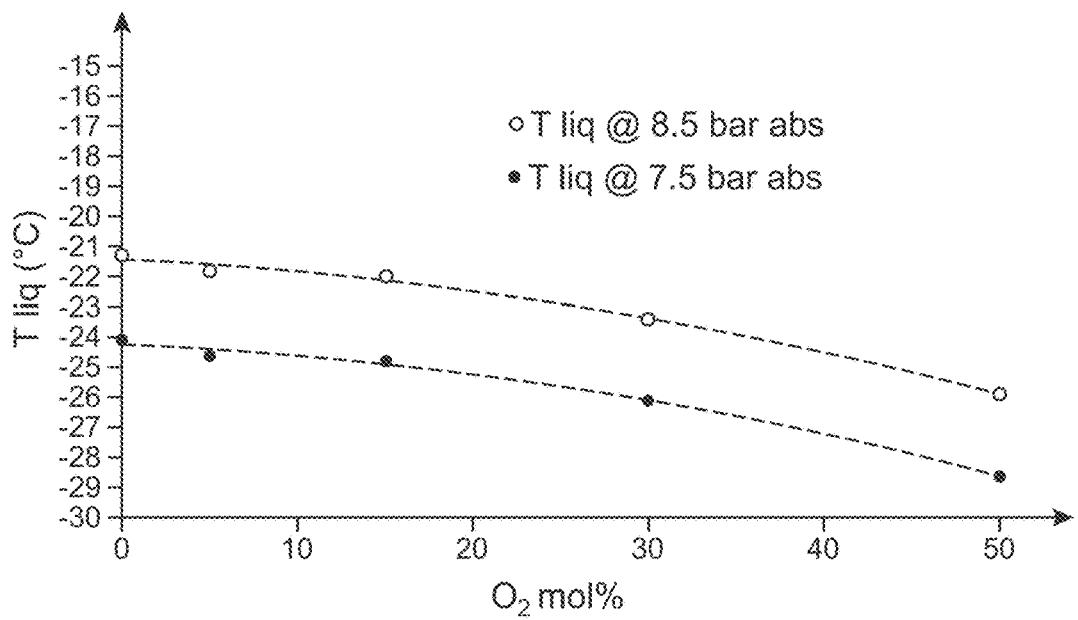
FIG. 1 presents the liquefaction temperature of gas mixtures comprising $CO_2$, 6 mol % of $(CF_3)_2CF$—CN and different mole percentages of $O_2$, at a pressure of 7.5 bars (i.e. 7500 hPa) absolute or at a pressure of 8.5 bars (i.e. 8500 hPa).

The liquefaction temperature of gas mixtures comprising $CO_2$, 6 mol % of $(CF_3)_2CF$—CN and different mole percentages of $O_2$, at a pressure of 7.5 bars (i.e. 7500 hPa) absolute or at a pressure of 8.5 bars (i.e. 8500 hPa) absolute is presented in FIG. 1.

The obtained values for the liquefaction temperature are summarized in the below Table I.

TABLE I

| Mixture | Liq T at 7.5 bars abs | Liq T at 8.5 bars abs |
| --- | --- | --- |
| 6 mol % $(CF_3)_2CF$—CN + $CO_2$ + 0% $O_2$ | −24.1° C. | −21.3° C. |
| 6 mol % $(CF_3)_2CF$—CN + $CO_2$ + 5 mol % $O_2$ | −24.6° C. | −21.8° C. |
| 6 mol % $(CF_3)_2CF$—CN + $CO_2$ + 15 mol % $O_2$ | −24.8° C. | −22° C. |
| 6 mol % $(CF_3)_2CF$—CN + $CO_2$ + 30 mol % $O_2$ | −26.1° C. | −23.4° C. |
| 6 mol % $(CF_3)_2CF$—CN + $CO_2$ + 50 mol % $O_2$ | −28.6° C. | −25.9° C. |

The liquefaction temperature of mixtures comprising no oxygen, 5 mol % of oxygen or 15 mol % oxygen does not significantly vary. There is less than 1 degree of difference between the different liquefaction temperatures at a pressure of 7.5 bars (i.e. 7500 hPa) absolute or at a pressure of 8.5 bars (i.e. 8500 hPa) absolute.

On the contrary, by increasing the mole percentage of oxygen in the mixture to 30% or to 50%, the liquefaction temperature is significantly lowered when compared to the liquefaction temperatures of mixtures comprising no oxygen, 5 mol % of oxygen or 15 mol % oxygen. In particular, the liquefaction temperatures are reduced by more than 4 degrees when the oxygen ratio in the mixture reaches 50 mol % at a pressure of 7.5 bars (i.e. 7500 hPa) absolute and at a pressure of 8.5 bars (i.e. 8500 hPa) absolute.

Figure 2:
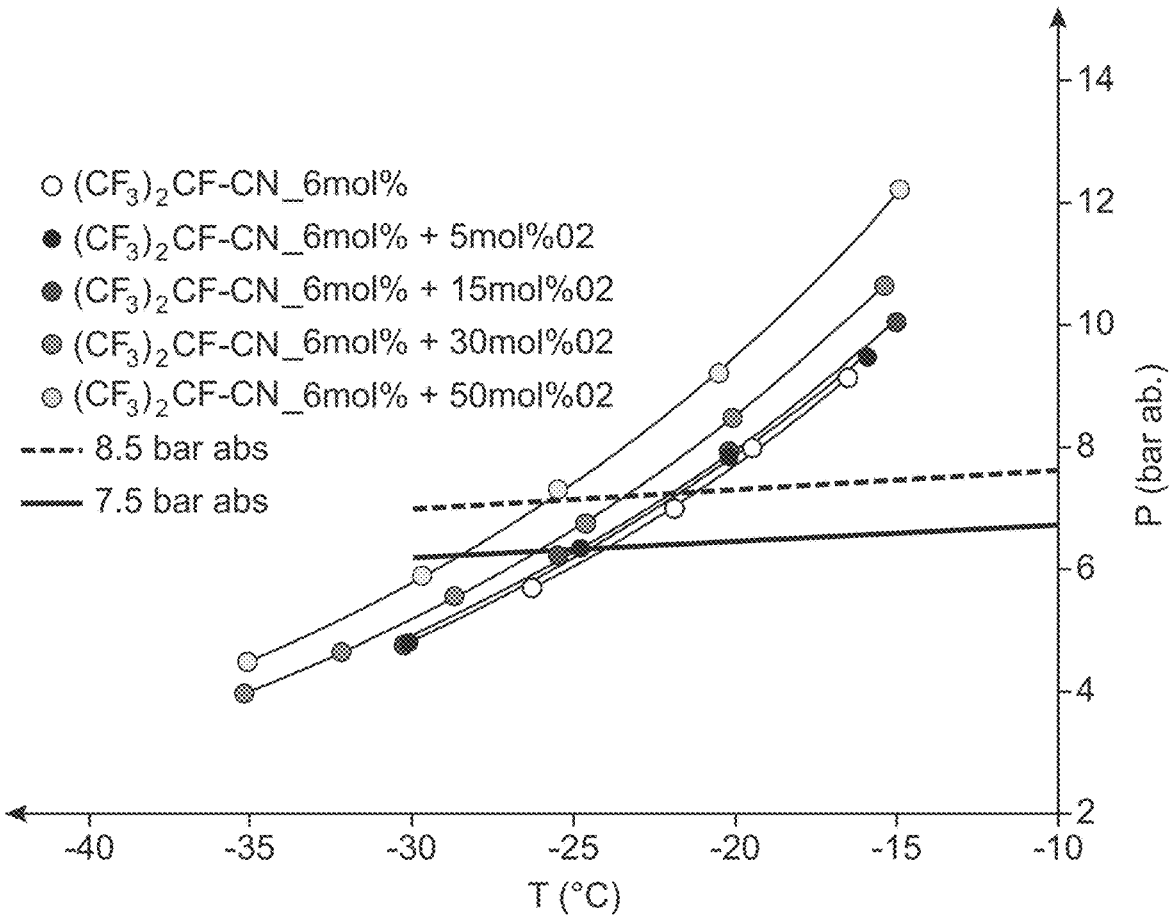
FIG. 2 presents the pressure at liquefaction as a function of temperature for gas mixtures comprising $CO_2$, 6 mol % of $(CF_3)_2CF$—CN (Novec 6 mol %) and different mole percentages of $O_2$.

This is confirmed when considering the pressure at liquefaction as a function of temperature for gas mixtures comprising $CO_2$, 6 mol % of $(CF_3)_2CF-CN$ and different mole percentages of $O_2$ (FIG. 2).

There is an almost complete overlap for the curves obtained for mixtures comprising no oxygen, 5 mol % of oxygen or 15 mol % oxygen while the curves obtained for mixtures comprising 30 mol % of oxygen or 50 mol % oxygen shift to 20 lower temperatures.

Figure 3:
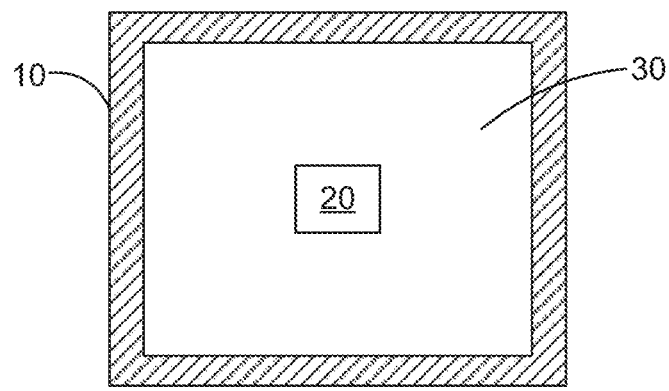
FIG. 3 is a schematic view of a leak tight enclosure in which there are located electrical components and a gas mixture for providing electrical insulation and/or for extinguishing electrical arcs that are likely to occur in said enclosure.

FIG. 3 is a schematic view of a leak tight enclosure 10 in which there are located electrical components 20 and a gas mixture 30 for providing electrical insulation and/or for extinguishing electrical arcs that are likely to occur in said enclosure 10.

BIBLIOGRAPHY

[1] International application WO 2014/037566
[2] International application WO 2015/040069 [3] International application WO 2017/114862

We claim:

1. A medium- or high-voltage equipment including a leaktight enclosure in which there are located electrical components and a gas mixture for providing electrical insulation and/or for extinguishing electric arcs that are likely to occur in said enclosure, the gas mixture comprising heptafluoroisobutyronitrile, carbon dioxide and oxygen, wherein oxygen presents a molar percentage equal to or higher than 26%, in said gas mixture.

2. The equipment according to claim 1, wherein oxygen in said gas mixture presents a molar percentage lying in a range of 28% to 50%.

3. The equipment according to claim 2, wherein said gas mixture comprises:
   from 40 mol % to 70 mol % of carbon dioxide,
   from 2 mol % to 10 mol % of heptafluoroisobutyronitrile, and
   from 28 mol % to 50 mol % of oxygen.

4. The equipment according to claim 1, wherein oxygen in said gas mixture presents a molar percentage lying in range of 30% to 50%.

5. The equipment according to claim 4, wherein said gas mixture comprises:
   from 40 mol % to 68 mol % of carbon dioxide,
   from 2 mol % to 10 mol % of heptafluoroisobutyronitrile, and
   from 30 mol % to 50 mol % of oxygen.

6. The equipment according to claim 1, wherein said gas mixture comprises:
   from 40 mol % to 72 mol % of carbon dioxide,
   from 2 mol % to 10 mol % of heptafluoroisobutyronitrile, and
   at least 26 mol % of oxygen.

7. The equipment according to claim 1, wherein part of the electrical components arranged inside the enclosure of said equipment is covered by solid insulating layers.

8. The equipment according to claim 1, wherein said equipment is a gas-insulated electrical transformer, an overhead or buried gas-insulated line, a set of busbars for transporting or distributing electricity, an element for connection to other equipment in a network, or a connector/disconnector.

9. The equipment according to claim 1, wherein said equipment presents a minimum pressure of 7.5 bars (i.e. 7500 hPa) absolute and a nominal pressure of 8.5 bars (i.e. 8500 hPa) absolute.

10. An use of a gas mixture comprising heptafluoroisobutyronitrile, carbon dioxide and oxygen, as a gas for electrical insulation and/or for electric arc extinction in medium- or high-voltage equipment, in which part of the equipment may further be covered with a solid insulating layer, wherein oxygen presents a molar percentage equal to or higher than 26%, in said gas mixture.

* * * * *